United States Patent [19]
Chen

[11] Patent Number: 5,666,014
[45] Date of Patent: Sep. 9, 1997

[54] VELOCITY-CONTROLLED MAGNETIC BEARINGS

[75] Inventor: Hsiang-Ming Chen, Latham, N.Y.

[73] Assignee: Mechanical Technology Inc., Latham, N.Y.

[21] Appl. No.: 277,897

[22] Filed: Jul. 20, 1994

[51] Int. Cl.⁶ .................................................. H02K 7/09
[52] U.S. Cl. .................... 310/90.5; 310/68 R; 318/615
[58] Field of Search .................... 310/51, 90.5, 68 B; 364/565, 164; 318/606, 615, 616–619, 718, 721, 799, 437

[56] References Cited

U.S. PATENT DOCUMENTS

| | | | |
|---|---|---|---|
| 3,785,709 | 1/1974 | Atkinson | 310/90.5 |
| 4,076,998 | 2/1978 | Montagu | 318/132 |
| 4,090,745 | 5/1978 | Dohogne et al. | 310/90.5 |
| 4,186,332 | 1/1980 | Montagu | 318/132 |
| 4,555,513 | 11/1985 | Fulton et al. | 318/138 |
| 4,574,227 | 3/1986 | Herder et al. | 318/616 |
| 5,013,987 | 5/1991 | Wakui | 310/90.5 |
| 5,020,125 | 5/1991 | Losic et al. | 318/606 |
| 5,144,564 | 9/1992 | Naidu et al. | 318/721 |
| 5,256,952 | 10/1993 | Yoneyama et al. | 310/90.5 |
| 5,264,982 | 11/1993 | Cox et al. | 310/90.5 |
| 5,449,985 | 9/1995 | Kanemitsu et al. | 310/51 |
| 5,471,106 | 11/1995 | Curtis et al. | 310/90.5 |
| 5,479,556 | 12/1995 | Oh | 318/254 |
| 5,491,396 | 2/1996 | Takahashi et al. | 310/90.5 |

*Primary Examiner*—Thomas M. Dougherty
*Assistant Examiner*—B. Mullins
*Attorney, Agent, or Firm*—Kane, Dalsimer, Sullivan, Kurucz, Levy, Eisele and Richard, LLP

[57] ABSTRACT

The invention is an actively controlled radial magnetic bearing using inexpensive and rugged search coils as sensors instead of costly and delicate displacement or position sensors. It involves a feedback control scheme totally different from the conventional PID control algorithm. It comprises a velocity estimator with search coil signals as input, a velocity feedback controller with high-frequency gain and phase modification for the purpose of controlling flexible rotors, a self-starter automating the levitation, and a unique design and tuning method of analysis.

5 Claims, 5 Drawing Sheets

VELOCITY-CONTROLLED MAGNETIC BEARINGS

BACKGROUND OF THE INVENTION

1. Field of the Invention

This invention pertains to active magneto bearings with velocity search coils in place of displacement (position) sensors, and the associated velocity feedback control scheme, particularly for radial types of active magnetic bearings.

2. Description of the Prior Art

In the prior art, displacement sensors have been used in the control systems for active magnetic bearings. The following U.S. patents utilize the displacement sensors:

U. S. Pat. No. 5,227,948 to Boon et al

U.S. Pat. No. 5,247,219 to Nakagawa et al

U.S. Pat. No. 5,216,308 to Meeks

U.S. Pat. No. 5,142,175 to Watanabe

U.S. Pat. No. 5,182,533 to Ritts

U.S. Pat. No. 4,841,184 to Chen et al (the present inventor)

U.S. Pat. No. 5,084,643 to Chen (the present inventor)

The displacement sensors are expensive and prone to failure in harsh environments. Works on active magnetic bearings without using displacement sensors include the following publications:

REFERENCES:

1) Henrikson, C. H., et al, "Magnetically Suspended Momentum Wheels For Spacecraft Stabilization," AIAA paper no. 74-128.

2) Robinson, A. A., "Magnetically Suspended Momentum Wheel For Satellite Stabilization," IEE Conf. Pub. 142, 2nd Conf. Adv. Mag. Mat. and Appl., September 1976, pages 131-134.

3) Vischer, D. & Bleuler, H.,"A New Approach to Sensorless and Voltage Controlled AMBS based on Network Theory Concepts," Proc. 2nd Int. Symp. on Magnetic Bearings, Univ. of Tokyo, July, 1990.

4) Bleuler, H., & Vischer; D.,"Magnetic Bearings with Minimum Hardware Requirement," ROMAG'91 Magnetic Bearing & Dry Gas Seals Conference, March 13-15, Washington D.C.

5) Mizuno, T., et al, "Towards Practical Applications of Self-sensing Magnetic Bearings," 3rd Int. Conf. on AMBs.

References 1 and 2 have utilized directly a velocity sensor for controlling a thrust magnetic bearing. It was for supporting a momentum wheel where the rotor is relatively rigid or lacks high frequency vibration resonances. Since the control system was activated by rotor velocity, it was difficult to start the bearing levitation from a resting rotor.

References 3, 4 and 5 have utilized an observer algorithm which estimates the states (displacement, velocity, etc.) of the bearing system including the rotor, based on measured currents and EMFs in the magnetizing coils. The observer type of controller was difficult to tune because of many parameters involved, particularly, the coil copper resistance which vary strongly with temperature.

OBJECTS AND SUMMARY OF THE INVENTION

It is therefore an object of this invention to provide inexpensive, rugged sensors which are insensitive to temperature and to provide the corresponding control and start-up schemes for active magnetic bearings.

It is therefore a further object to provide inexpensive control system for radial type magnetic bearings which are easy to tune and able to support flexible rotors which inherently have high frequency bending resonances.

These objects are achieved by the following elements of the invention:

1) A search coil is collocated with the magnetizing coil of each electromagnet. The search coils with no current flowing in them pick up voltage signals due to flux variation in the magnetic cores. The voltage signals are insensitive to resistance change due to temperature variation.

2) A velocity estimator (VE) combines two search coil signals from opposite electromagnets and the measured control current signal, and re-creates the rotor velocity in the bearing axis defined by the two electromagnets.

3) A velocity trimmer cuts the high-frequency feedback gain of the velocity from VE to a desired value so to minimize rotor high-frequency excitation or noise.

4) A high-frequency gain and phase compensator which may include lead-lag and/or notch filters, provides the means to tailor the stiffness and damping for controlling the lower rotor bending vibration modes.

5) A feed forward control input is provided to accept synchronous rotating magnetic force commands to power amplifiers for canceling large rotor unbalance force.

6) An automatic start-up scheme which involves sequential energizing of bias currents, momentarily grounding the output of the zero force seeking loop (ZFSL), and injecting a DC voltage at the input of the ZFSL, provides a means of self-starting.

Furthermore, a non-dimensional analytical method provides a means for fast tuning to control rigid-body vibration modes at low-frequency range, regardless of the sizes of the bearings.

BRIEF DESCRIPTION OF THE DRAWINGS

Further objects and advantages of the invention will become apparent from the following description and claims, and from the accompanying drawings, wherein:

DETAILED DESCRIPTION OF THE EMBODIMENT

Figure 1A:
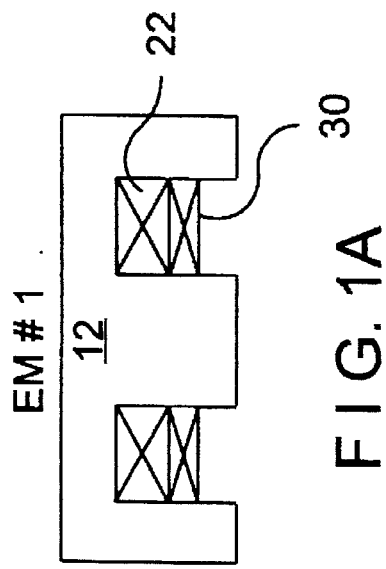
FIG. 1 is a cross-sectional view of a radial active magnetic bearing as viewed along the rotational shaft axis.
Figure 1:
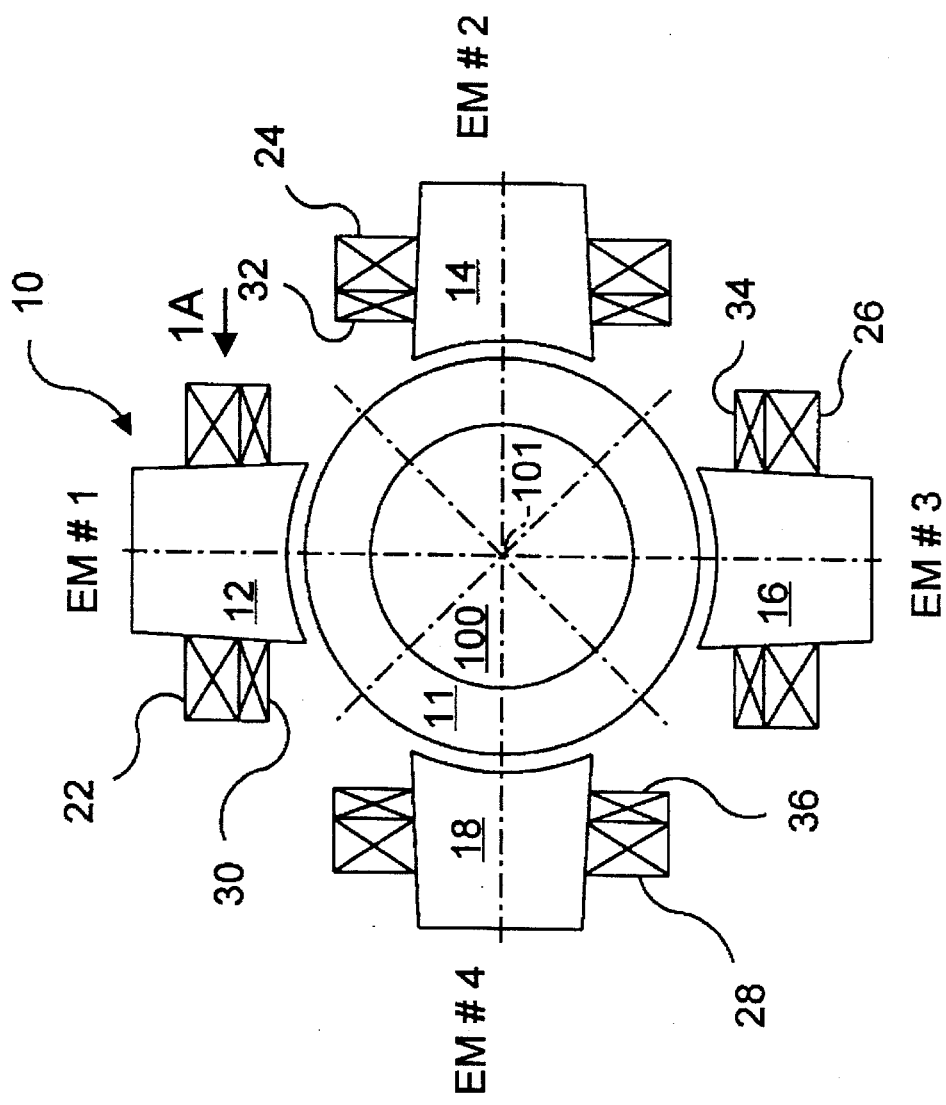

Referring now to the drawings in detail wherein like numerals indicate like elements throughout the several views, one sees that FIG. 1 is a cross-sectional view of shaft 100 journaled for rotation about rotational axis 101. Rotor 11 which may or may not laminated is integrally formed with the shaft 100 and rotationally symmetric about axis 101, and located inside of four stationary electromagnets (EMs) 12, 14, 16 and 18. Each EM comprises an E-shaped core which may or may not be laminated, a magnetizing coil 22, 24, 26 or 28, and a search coil 30, 32, 34 or 36. The four EMs are fixed to stationary part of a machine not shown in FIG. 1. The magnetizing coil 22, 24, 26 or 28 of an EM is driven by a current source power amplifier. An opposite pair of EMs, i.e., 12 & 16 or 14 & 18 control the shaft motion in the direction defined by the center line of the EM pair which is called a control axis. The two control axes of a radial magnetic bearing are perpendicular to each other. Each magnetizing coil is provided with a steady state current called bias current $I_b$. The shaft position in the bearing is maintained by modulating the bias current with a control current When one EM coil bias is added by i, the opposite EM is subtracted by the same amount.

Figure 2:
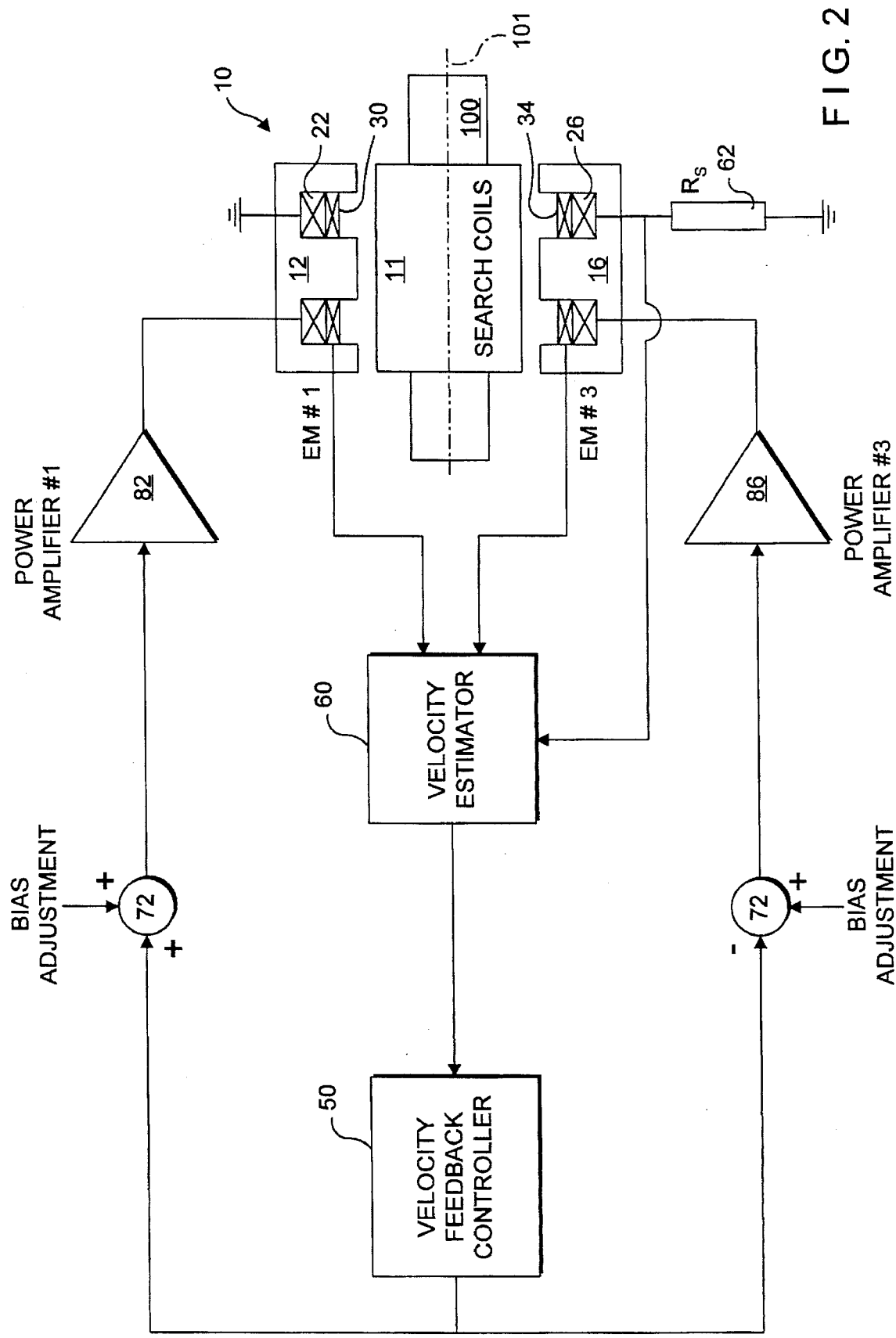
FIG. 2 is a schematic of the control system for either one of the two axes of the radial active magnetic bearing.

FIG. 2 illustrates a schematic of the electronics for controlling radial bearing 10. Two identical, but independent sets of such electronics are required for controlling the radial bearing. The voltage signals of the search coils 30 and 34 are input to velocity estimator 60. Another input to the velocity estimator 60 is a control current signal i as measured by the resister 62. The output of 60 is a signal proportional to the motion velocity of the rotor 11. This output is fed to velocity feedback controller 50. The output of the controller 50 is fed to two summers 72 and 76 where signals for bias currents are added and adjusted if necessary. At the summer 72 the controller 50 output is added to the bias, and at the summer 76 it is subtracted from the bias. The output of summer 72 is a voltage signal with a small amount of power and it drives the power amplifier 82 which produces a current in the magnetizing coil 22 or the electromagnet 12. Similarly, the output of summer 76 drives power amplifier 86 which produces a current in coil 26 of electromagnet 16. The net effect of the currents is a net magnetic force which counteracts the outside disturbance to the rotor and keeps the rotor at a position in the bearing where the static forces on the rotor is balanced. This position is an implicit, inherent reference position of the bearing control.

Figure 3:
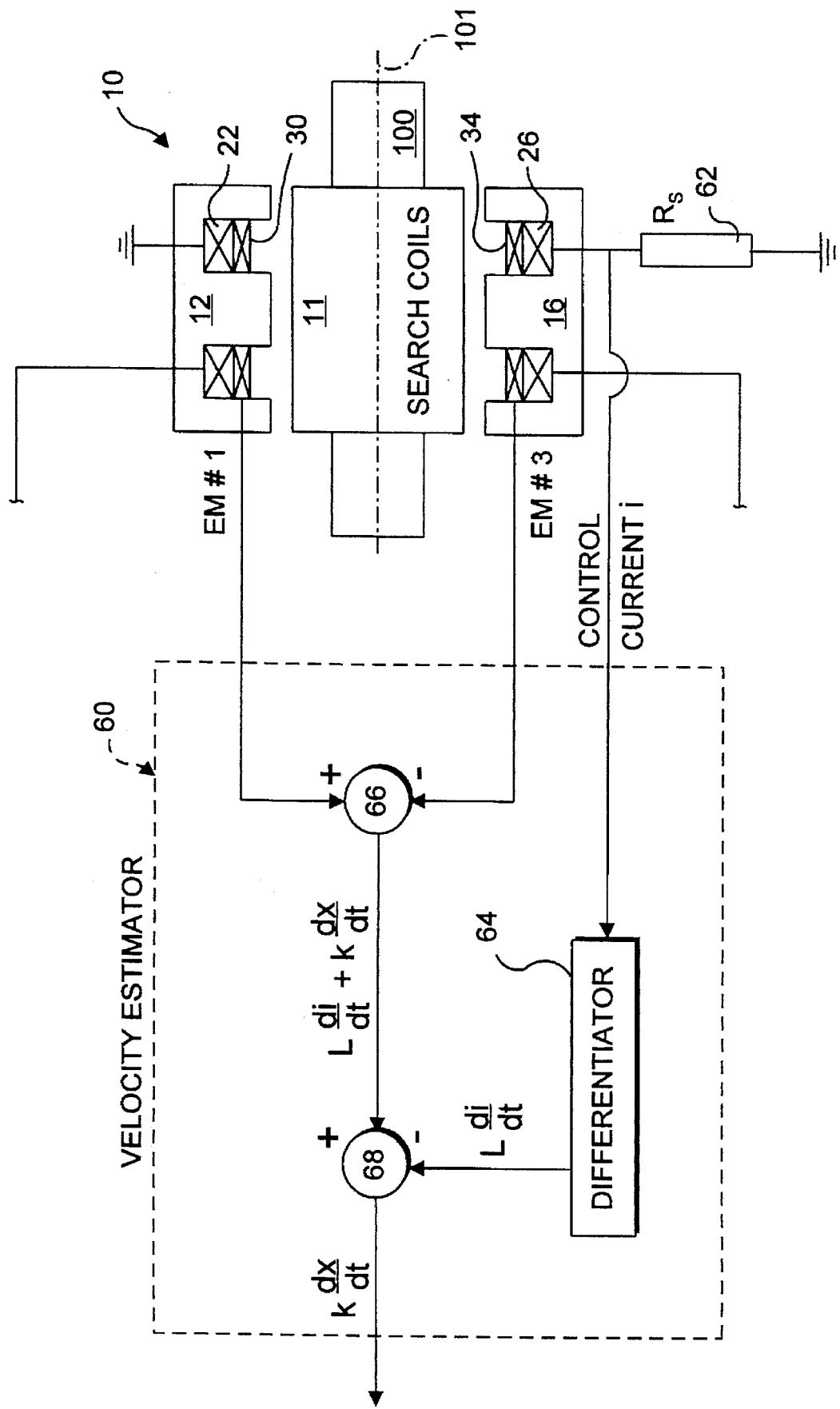
FIG. 3 is a diagram of the velocity estimator with two search coil input and one current measurement input.

FIG. 3 illustrates the details of the velocity estimator 60. When the rotor 11 moves around the center of the bearing, the search coils 30 and 34 will have EMF signals of similar amplitudes but 180° out of phase. Therefore, the signal from search coil 30 is added to the inverse of the signal from the search coil 34 at the summer 66 to achieve doubled amplitude. If the rotor 11 moves in a large excursion, the EMF signals will not be equal because of the nonlinearity effect of the magnetic flux with respect to an airgap. Therefore, the addition of the two signals helps to reduce the nonlinearity effect. The output of summer 66 is a signal mixed with two components, i.e., the component due to control current Ldi/dt (L=inductance of electromagnet 12 or 16), and the component kdx/dt due the motion (x) of the rotor 11 ($k=LI_b g$ g=concentric air gap between rotor 11 to electromagnet 12 or 16). The other input to velocity estimator 60 is the control current signal i as measured by the resistor 62. Note that the control in coils 22 and 26 always have the same amplitudes but 180° out of phase. Therefore, it is adequate to measure the current at one of the two coils 22 and 26. The current signal is fed to a differentiator 64 which has a roll-off frequency at typically 2000 Hz. The output of 64 is a recreated signal Ldi/dt which is subtracted from the output of summer 66 at summer 68. The output of summer 68 that is also the output of velocity estimator 60, is therefore a signal proportional to the velocity dx/dt of rotor 11. Since there is no current flowing in the search coils, there will be no voltage drop signal involved with the resistances of the search coils. Therefore, the velocity estimator output is insensitive to the change of the search coil temperature.

Figure 4:
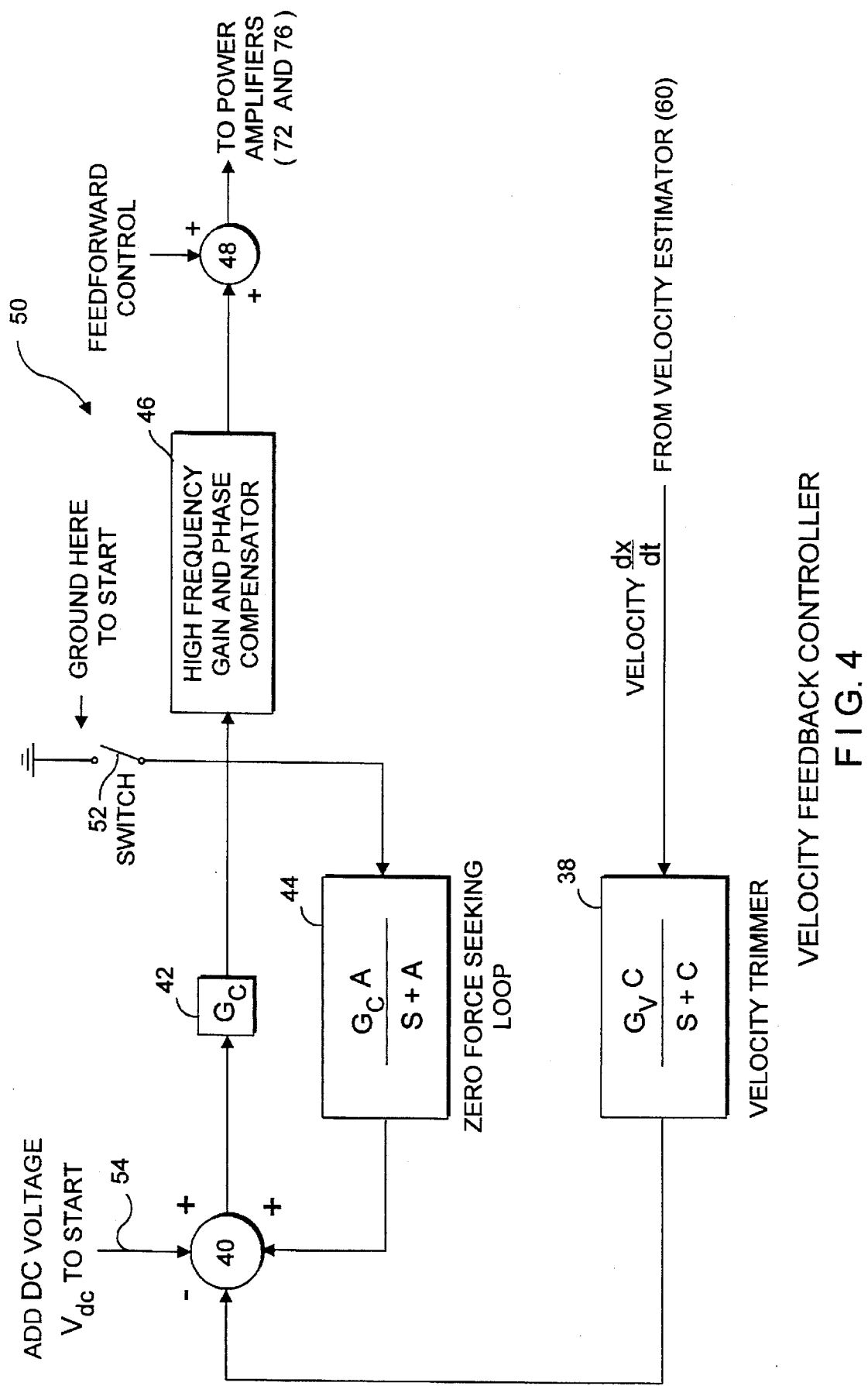
FIG. 4 is the detailed diagram of the velocity feedback controller.

FIG. 4 illustrates the details of velocity feedback controller 50. There are five important elements in the figure, namely:

1) velocity trimmer
2) zero force seeking loop
3) high-frequency gain and phase compensator
4) feed forward control input
5) self-start scheme The velocity trimmer 38 is a first-order low-pass filter with a time constant 1/C and a gain $G_v$. It cuts down in general the high frequency feedback gain of the velocity, thereby reducing the amount of excited mechanical or electrical noise of the bearing system. The noise can easily saturate the power amplifiers. Therefore, the purpose of the velocity trimmer 38 is to make the system more stable in the high-frequency range.

The zero force seeking loop includes summer 40, gain stage 42 and a low-pass filter 44. The function of this loop was a prior art as published in References 1 and 2. It accepts the inverted signal from the velocity trimmer and positively feeds back its own output. This loop by itself is unstable and tends to be saturated or its output always latches to the plus or minus supply voltages. But working with the unstable negative spring of the bias flux field, it makes the whole system stable. The low-pass filter time constant 1/A is much longer than velocity trimmer's time constant 1/C.

The high-frequency gain and phase compensator 46 may include a lead-lag filter and/or notch filter(s). It is meant to change to control signal gain and phase at frequencies an order higher than the rigid-body vibration frequencies of the rotor 11. Specifically, it will be tailored for controlling the rotor bending vibration modes and sometimes some resonances of the stationary supporting structure.

The summer 48 provides an input for feed forward control such as the prior art of virtual balancing. This prior art produces a rotating magnetic force synchronous to rotation for cancelling rotor unbalance force.

To provide a self-start, we have to know the side of the electromagnet which the rotor 11 is resting or leans on. The information is available through sequentially turning on the bias currents. In other words, the rotor 11 will rest on the electromagnet first turned on. Knowing this, the polarity of a DC voltage signal 54 can be determined. The self-start process is to turn on the DC signal 54 and momentarily ground the zero force seeking loop output by using the switch 52. The final step is to turn off the DC signal 54 after the rotor 11 is levitated.

Figure 5:
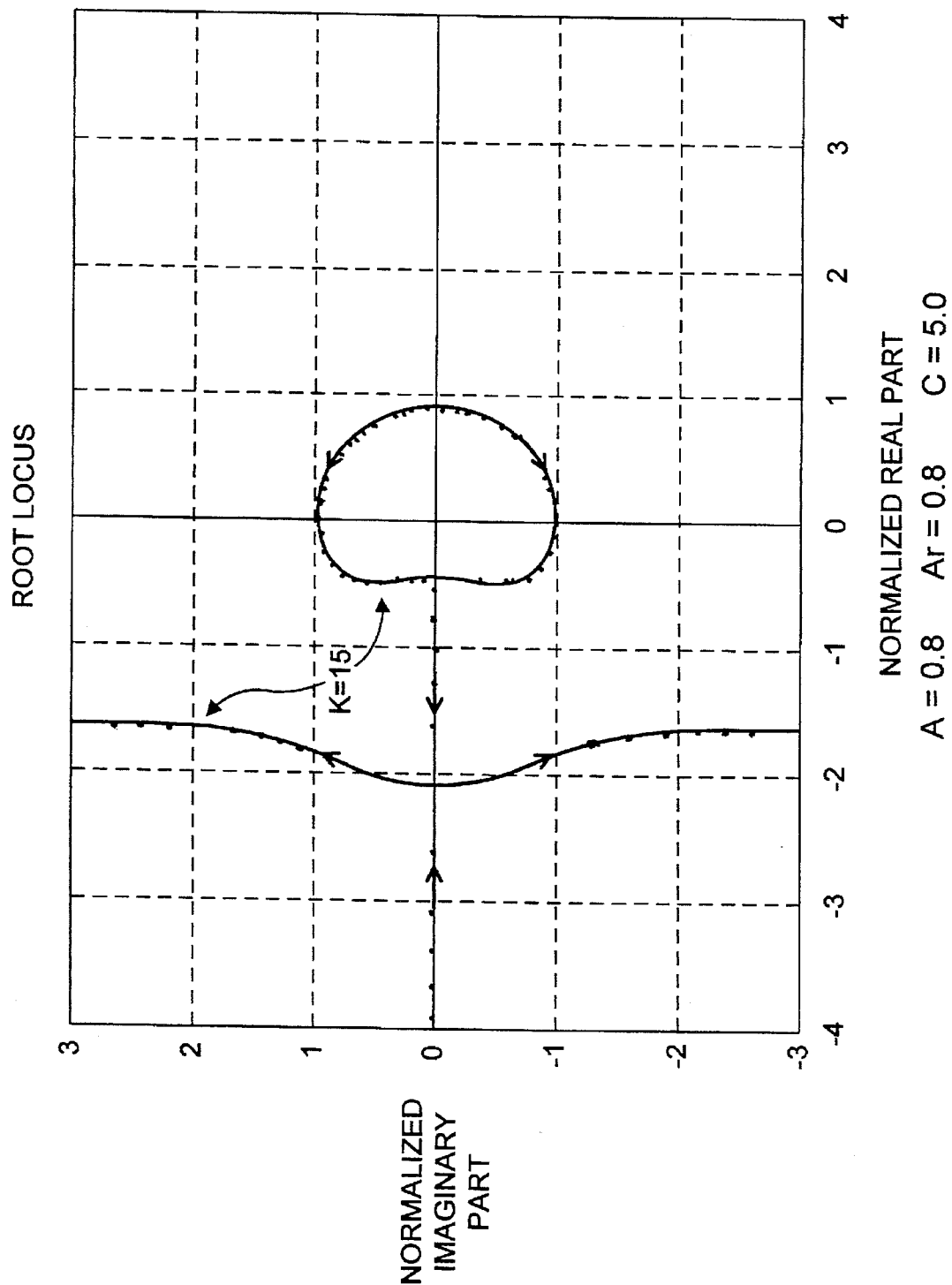
FIG. 5 is non-dimensional root-locus plot showing how to select the controller parameters for controlling rigid-body modes.

FIG. 5 is a root-locus plot of a dynamic system including the mass of rotor 11 in the bearing which is velocity controlled using the velocity trimmer 38 and the zero force seeking loop (40, 42, 44). This type of stability plot will be used for determining the parameters which is crucial for stabilize the levitation of rotor mass. The plot is based on the characteristics equation of the dynamic system:

$$1+KS(S+A)/(S^2-1)(S-A_r)(S+C)=0 \qquad (1)$$

where $A_r=(G_c G_e-1)A$ $K=G_c G_v C K_i/MB$ $B=SQRT(K_m/M)$ $K_i$ and $K_m$ are current stiffness and magnetic stiffness due to the bias magnetic field. In equation (1), S (Laplace variable), A, $A_r$, and C are all normalized by the artificial frequency B. It was assumed that the power amplifiers have a constant sensitivity of 1 ampere per volt and the velocity estimator has a constant sensitivity of 1 volt per inch per second. There are four parameters in equation (1) which have to be determined for a stable control. These parameters are A, $A_r$, C and K. The root-locus plot of FIG. 5 was made by varying normalized loop gain K. For every set of A, $A_r$ and C values, there is a range of K value that the system will have two well damped roots. For example, for K=15 as shown in FIG. 5, the two pair of complex conjugate roots are both well damped. For different combination of A, $A_r$ and C values, the shapes of the root loci will be different. One can choose the desired shapes from a pre-calculated non-dimensional data bank and determine the control parameters. This design tool and method greatly simplifies the design and tuning process of the bearing controller.

Two similar but independent sets of electronic circuitry as presented by FIG. 2 are required to control the radial magnetic bearing 10 formed by rotor 11 and stationary electromagnets 12, 14, 16 and 18. Each set is designed and tuned by using the analytical method presented in FIG. 5.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A radial bearing apparatus comprising:

a stator of electromagnets;

a rotor journaled for rotation within said stator;

said stator including a plurality of search coils and magnetizing coils, said search coils measuring signals related to velocity of said rotor;

a velocity estimator receiving voltage signals from said search coils and producing a velocity signal of said rotor; and a velocity feedback controller comprising:

a velocity trimmer responsive to said velocity signal from said velocity estimator;

a zero force seeking loop responsive to said velocity trimmer;

a high-frequency gain and phase compensator responsive to said zero force seeking loop;

a summer responsive to said compensator and a feed forward control signal; and a self-starter in communication with said velocity feedback controller.

2. The radial bearing apparatus of claim 1 wherein the velocity estimator receives two voltage signals from said search coils and a measured control current signal, and further includes a summer which combines signals from said search coils, a differentiator receiving said control current signal, and another summer which combines the output of the first summer and the output of the said differentiator to produce a signal proportional to velocity of said rotor.

3. The radial bearing apparatus of claim 1 wherein said rotor is a flexible rotor and the apparatus supports said flexible rotor and wherein said apparatus further includes a velocity controller for modifying high-frequency feedback gains; said velocity trimmer includes an adjustable gain and a low-pass filter with a adjustable time constant.

4. The radial bearing apparatus of claim 1 wherein said rotor is a flexible rotor and the apparatus supports said flexible rotor and wherein the high-frequency gain and phase compensator is included in a velocity feedback controller; said high-frequency gain and phase compensator responsive to said zero force seeking loop; said gain and phase compensator including at least one filter chosen from the group consisting of lead-lag filters, notch filters, and gain and phase modifying filters.

5. The radial bearing apparatus of claim 1 wherein said self-starter is included in said velocity feedback controller; said self-starter includes a sequential turn-on mechanism for bias currents, a DC voltage input to said zero force seeking loop and a grounding switch at an output of said zero force seeking loop.

* * * * *